United States Patent [19]

Bigwood et al.

[11] Patent Number: 4,788,223
[45] Date of Patent: Nov. 29, 1988

[54] LOW-RINSE, HIGH-CAPACITY, WEAKLY BASIC ACRYLIC ION EXCHANGE RESIN

[75] Inventors: Michael P. Bigwood, Oreland; John O. Naples, Dresher, both of Pa.

[73] Assignee: Rohm and Haas Company, Philadelphia, Pa.

[21] Appl. No.: 759,529

[22] Filed: Jul. 26, 1985

[51] Int. Cl.$^4$ .............................................. B01J 41/14
[52] U.S. Cl. ...................................... 521/32; 526/342; 525/329.3
[58] Field of Search .......................... 525/329.3; 54/31; 526/342; 521/32

[56] References Cited

U.S. PATENT DOCUMENTS

| | | | |
|---|---|---|---|
| 3,311,572 | 3/1967 | Storey et al. | 525/329.3 |
| 3,389,096 | 6/1968 | Abrams et al. | 525/329.3 |
| 3,687,912 | 8/1972 | Corte et al. | 521/31 |

*Primary Examiner*—Joseph L. Schofer
*Assistant Examiner*—Peter F. Kulkosky
*Attorney, Agent, or Firm*—John E. Taylor, III

[57] ABSTRACT

Copolymers of acrylonitrile with aliphatic cross-linkers having two or more unconjugated vinylic groups are functionalized with polyamines to form weakly basic anion exchange resins having both low rinse-volume requirements and high anion exchange capacity.

18 Claims, No Drawings

LOW-RINSE, HIGH-CAPACITY, WEAKLY BASIC ACRYLIC ION EXCHANGE RESIN

This invention relates to ion exchange resins, and more particularly to weakly basic, gel acrylic anion exchange resins having both high anion exchange capacity and low rinse requirements, and to a process for making these resins.

BACKGROUND OF THE INVENTION

Among anion exchange resins, those with acrylic polymer backbones are known for having higher exchange capacity and greater fouling resistance than styrenic resins. The weakly basic, acrylic resins prepared from conventional acrylic esters, however, are difficult to rinse after regeneration. One reason for this rinse difficulty is that trace amounts of carboxylic acid functionality remain in the functionalized resin, where they retain cations from the regenerant, and release them gradually into the rinse water. Prolonged rinsing eventually reduces the cations to a reasonable level, but this takes excessive time and rinse water.

The prior-art solution to this high-rinse-volume requirement has been to use macroreticular acrylic resins, but these resins have significantly lower anion exchange capacity than the high-rinse-volume, acrylic resins.

Corte et al., in U.S. Pat. No. 3,544,488, describe a copolymer of acrylonitrile with aliphatic, including cycloaliphatic, crosslinkers containing two or more unconjugated vinyl groups; such a copolymer resists hydrolysis much better than acrylonitrile copolymers crosslinked with divinylbenzene or other, aromatic crosslinkers. In the Corte reference these copolymers were used to prepare only cation exchange resins. Bufton et al., in U.S. Pat. No. 3,423,336, disclose preparation of weakly basic anion exchange resins by functionalizing acrylonitrile copolymers with anhydrous polyamines. The copolymers are crosslinked with conventional crosslinkers such as esters and polyvinyl aromatic monomers, and suffer from the stability problems discussed by Corte et al. Abrams et al., in U.S. Pat. No. 3,389,096, disclose a similar reaction to that of the Bufton reference, but functionalization occurs in the presence of water. As the copolymer is the same as Bufton's, the disadvantages are the same.

THE INVENTION

We have discovered stable, weakly basic, acrylic anion exchange resins that combine the low rinse requirements of low-capacity, macroreticular anion exchange resins with the high capacity of high-rinse, gel anion exchange resins. The resins of the present invention are polyamine-functionalized, acrylonitrile copolymers crosslinked with aliphatic, including cycloaliphatic, crosslinking monomers containing two or more unconjugated vinyl groups. The resins are made either by hydrolyzing the copolymers and subsequently aminating them with a polyamine, or by directly aminating the copolymers with a mixture of a polyamine and water. In use, these resins show high capacity for removing anions from liquids, and low rinse requirements during regeneration.

DETAILED DESCRIPTION OF THE INVENTION

Copolymers useful in the present invention are prepared by copolymerizing acrylonitrile monomer with an aliphatic, crosslinking monomer containing two or more unconjugated vinylic groups, preferably 2-3 unconjugated vinylic groups. The aliphatic crosslinking monomer may be a cycloaliphatic monomer, and the aliphatic crosslinking monomer is present at levels of from about 0.05 to about 20, and preferably from about 1 to about 10, percent by weight of the total monomer weight. Polymerization is initiated using any of the free-radical polymerization initiators, including azo-, peroxide and perester initiators, at levels from about 0.1 to about 15% by weight of the monomer mixture and at a temperature from about 40° to about 90° C., preferably from about 50° to about 70° C. Ultraviolet radiation may also be used to initiate polymerization. The monomer mixture is preferably dispersed during polymerization in from about 1 to about 5 times the monomer volume of water, containing from about 0.1 to about 2% by weight of the aqueous phase of a dispersing agent, and from about 0.1 to about 2% by weight of the aqueous phase of gelatin. Selection of the particular conditions for polymerization is within the capability of those skilled in the art.

The aliphatic crosslinking monomer containing two or more unconjugated vinylic groups is exemplified by the following monomers: 1,4-pentadiene; 1,5-hexadiene; 1,6-heptadiene; 1,7-octadiene; 1,8-nonadiene, n-1,4,9-decatriene; branched aliphatic crosslinkers such as 3,4-diethyl-1,5-hexadiene; cycloaliphatic crosslinkers such as 1,2,4-trivinylcyclohexane; and other, related, aliphatic crosslinkers such as triallyl isocyanurate.

Weakly basic anion exchange resins having high anion exchange capacity and low rinse requirements are prepared from the copolymer by functionalizing it with a polyamine, preferably a polyamine containing 2-4 amine groups. The amine groups of the polyamine are preferably separated by 2-4 methylene groups, and more preferably by 3 methylene groups. Examples of polyamines that may be used to functionalize the resins of the present invention include diethylenetriamine, triethylenetetramine, tetramethyliminobispropylamine, N,N-dimethylaminoethylamine, N,N-dimethylaminopropylamine and the like. As the amines supply the functional groups to the resin, a high ratio of amine groups to total molecular weight is preferred for a high-capacity resin. Long alkyl chains, or large nonfunctional substituents between the amine groups, while operable, are not preferred because they reduce the number of anion exchange functional groups per gram of resin.

The copolymer is functionalized by either hydrolyzing it in hot, aqueous caustic or acid, followed by treating it with from about 3 to about 8 times the copolymer weight of a polyamine for from about 5 to about 20 hours at from about 100° to about 200° C., or treating it directly with the polyamine in the presence of water at a level of 0 to about 52% by weight of the polyamine. When the copolymer is functionalized directly with polyamine and water, the water may optionally be distilled from the mixture during the functionalization. For aqueous functionalization the copolymer is treated with a similar weight of polyamine containing from about 5 to about 50% water, initially at from about 90° to about 120° C. for 0 to about 6 hours, after which the temperature is raised to the range from about 140° to about 180° C. and held there for from about 12 to about 20 hours.

While the copolymer and functionalized resin prepared according to the above process has some macroreticular structure, resulting from the insolubility of the copolymer in the acrylonitrile monomer, the rinse requirements of these resins are significantly lower than would be expected based on their porosity. At the same time, their anion exchange capacity is significantly higher than any previously known resins having similar rinse requirements. This surprising combination of high capacity and low rinse requirement is one of the resin's most significant advantages.

The following examples are intended to illustrate the invention, but not to limit it except as it is limited in the claims. All percentages are by weight unless otherwise indicated, and all reagents are of good commercial quality, unless otherwise indicated.

EXAMPLE 1

This example illustrates the preparation of an acrylonitrile copolymer crosslinked with an unconjugated polyvinyl aliphatic crosslinker, useful in the present invention.

In 550 ml deionized water 11.6 g poly(diallyldimethylammonium chloride), 1.16 g boric acid, 1.67 g sodium nitrite, and 3.25 g gelatin were dissolved. The pH of the solution was adjusted to 10.5 with aqueous sodium hydroxide and the solution was stirred. To the stirred solution a mixture of 375 g acrylonitrile, 16 g trivinylcyclohexane and 4 g 2-t-butylazo-2-cyano-4-methoxy-4-methylpentane was added. The resulting suspension was heated to 55° C. and maintained at that temperature for 6 hours, after which it was heated to 90° C. and maintained at that temperature for 1 hour. The resulting, opaque beads were washed with water and allowed to air dry.

EXAMPLE 2

This example illustrates the preparation of a comparative, aromatic-crosslinked copolymer. The procedure of Example 1 was used, except that the amount of acrylonitrile was 320 g, and the trivinylcyclohexane was replaced with 69 g divinylbenzene of 55% purity.

EXAMPLE 3

This example illustrates a more highly crosslinked acrylonitrile copolymer useful in the present invention. The procedure of Example 1 was used, except that the amount of acrylonitrile was 360 g and the amount of trivinylcyclohexane was 31 g.

EXAMPLE 4

This example illustrates preparation of a resin of the present invention by directly aminating the copolymer of Example 3. A 40 g sample of the copolymer of Example 3 was placed in a mixture of 85 ml diethylenetriamine and 10 ml deionized water, and the mixture was heated to 125° C. and maintained at that temperature for 16 hours. The resulting resin solids content was 52.0%, and the yield of resin was 66.9% of theoretical yield.

EXAMPLE 5

This example illustrates the preparation of an anion exchange resin from the comparative, aromatic-crosslinked copolymer of Example 2. The procedure of Example 4 was used, except that the copolymer was the copolymer of Example 2. The resulting resin solids content was 44.6%, and the yield of resin was 55.5% of theoretical yield.

EXAMPLE 6

This example illustrates an anion exchange resin of the present invention prepared by aminating the resin with dimethylaminopropylamine. A 40 g sample of the copolymer of Example 3 was added to a mixture of 340 g dimethylaminopropylamine and 45 g deionized water. The mixture was stirred and heated to 120° C., maintained at that temperature for 5 hours, heated to 160° C., and maintained at that temperature for 16 hours. The resulting resin solids content was 48.6%, and the yield of resin was 75.5% of theoretical yield.

EXAMPLE 7

This example illustrates the comparative, aromatic-crosslinked copolymer of Example 2, aminated with dimethylaminopropylamine. The procedure of Example 6 was used, except that the copolymer of Example 2 was used. The resulting resin solids content was 33.0%, and the yield of resin was 33.9% of theoretical yield.

EXAMPLE 8

This example illustrates the two-step hydrolysis and amination of the copolymer of Example 1. 100 g of the copolymer of Example 1 were hydrolyzed by refluxing in 50% sulfuric acid for 6 hours. The hydrolyzed copolymer was rinsed 3 times with water and dried. 40 g of the dry, hydrolyzed copolymer were suspended in 240 g of dimethylaminopropylamine, the mixture was heated to 160° C., and maintained at that temperature for 20 hours. The properties of the resulting anion exchange resin are given in Table 1.

EXAMPLE 9

This example illustrates measurement of rinse-volume requirements for resins of the present invention and comparative resins. Approximately 250 ml of each resin were placed in a ½-inch-diameter, glass column. The resin was exhausted with aqueous hydrochloric acid and subsequently regenerated with 4% aqueous sodium hydroxide solution; a 250% excess of regenerant, based on the anion exchange capacity of the resin, was used. The rinse requirement of the resin was then determined by passing deionized water through the freshly regenerated resin bed and measuring the electrical conductivity of the resin-bed effluent as a function of the number of bed volumes of rinse water passed through it.

The resins tested according to this example were the following:

| Resin | Description |
|---|---|
| A | The resin of Example 8. |
| B | A conventional, methyl acrylate-3.7% divinylbenzene gel copolymer, aminated with dimethylaminopropylamine (DMAPA) according to Example 8, but without the hydrolysis step. |
| C | A conventional, methyl acrylate-8% divinylbenzene, macroreticular copolymer, aminated with DMAPA according to Example 8, but without the hydrolysis step. |
| D | A copolymer useful in the present invention, prepared according to Example 1 except that 379 g acrylonitrile and 12 g trivinylcyclohexane were used, and aminated with DMAPA according to Example 8. |
| E | A copolymer useful in the present invention, prepared according to Example 1 and aminated with DMAPA according to Example 6. |
| F | A resin replicating Resin E. |
| G | A resin prepared the same as Resin E except |

-continued

| Resin | Description |
|---|---|
| | that the copolymer was prepared according to Example 1 using 367.5 g acrylonitrile and 23.5 g trivinylcyclohexane. |

The results of the rinse-requirement tests are shown in Table 1.

| Resin Properties | Resin A | Resin B (Comparative) | Resin C | Resin D | Resin E | Resin F | Resin G |
|---|---|---|---|---|---|---|---|
| Solids (%) | 40.9 | 38.6 | — | 35.4 | 40.5 | 40.6 | 42.8 |
| AEC(meq/g)[1] | 5.89 | 6.00 | — | 6.02 | 6.00 | 5.95 | — |
| CEC(meq/g)[1] | 0.14 | 0.24 | — | 0.41 | 0.16 | 0.21 | — |
| Average Size (mm) | 0.54 | 0.62 | 0.65 | 0.32 | 0.44 | 0.44 | 0.44 |
| Col. Cap. (kgr/ft$^3$)[2] | 23.1 | 20.9 | 13.1 | 21.6 | 22.1 | 22.9 | 24.79 |
| Rinse (BV)[3] | | | | | | | |
| To 50 μMHOS | 5.2 | 13.9 | 8.3 | 4.9 | 6.2 | 4.9 | 6.5 |
| To 20 μMHOS | 6.1 | 14.8 | 8.9 | 5.9 | 7.2 | 6.0 | 7.7 |
| To 3 μMHOS | 9.4 | 17.1 | 13.3 | 9.5 | 9.5 | 8.5 | 11.0 |

[1] Anion and cation exchange capacity in milliequivalents per gram of dry resin.
[2] Anion exchange capacity of resin, expressed as kilograins CaCO$_3$ per cubic foot of resin.
[3] Bed volumes of rinse water to reach effluent conductivity shown.

EXAMPLE 10

This example illustrates the amination of a polymer useful in the present invention, using a sulphur catalyst. A mixture of 40 g of resin prepared according to Example 1, 45 ml deionized water, 340 ml dimethylaminopropylamine and 3.40 g elemental sulphur were heated to 120° C. and maintained at that temperature for 4 hours, then heated to 160° C. and maintained at that temperature for 16 hours. The mixture was cooled, rinsed and drained. A total of 239 g of wet resin, having a solids content of 42.2%, was obtained, for a yield of 83%.

EXAMPLE 11

This example illustrates thioacetamide-catalyzed amination of a copolymer useful in the present invention. The materials and procedures of Example 10 were used except that the sulphur was replaced with 0.5 g thioacetamide. The yield of aminated resin was 86%.

We claim:

1. A weakly basic anion exchange resin having low rinse-volume requirements and high anion exchange capacity, which comprises a copolymer of acrylonitrile with an aliphatic crosslinking monomer having two or more unconjugated allylic groups, functionalized with a polyamine.

2. The resin of claim 1 wherein the polyamine contains 2–4 amine groups.

3. The resin of claim 1 wherein the amine groups of the polyamine are separated by 2–4 methylene groups.

4. The resin of claim 1 wherein the amine groups of the polyamine are separated by 3 methylene groups.

5. The resin of claim 1 wherein the polyamine is diethylene triamine.

6. The resin of claim 1 wherein the polyamine is triethylene tetramine.

7. The resin of claim 1 wherein the polyamine is dimethylaminopropylamine.

8. The resin of claim 1 wherein the aliphatic crosslinking monomer is a cycloaliphatic monomer.

9. A process for preparing a weakly basic anion exchange resin having low rinse-volume requirements and high anion exchange capacity, which comprises functionalizing, at a temperature of from about 100° to about 200° C. for from about 5 to about 20 hours, a copolymer of acrylonitrile and an aliphatic crosslinking monomer having two or more unconjugated allylic groups, with a polyamine.

10. The process of claim 9 wherein the polyamine contains 2–4 amine groups.

11. The process of claim 9 wherein the amine groups of the polyamine are separated by 2–4 methylene groups.

12. The process of claim 9 wherein the amine groups of the polyamine are separated by 3 methylene groups.

13. The process of claim 9 wherein the polyamine is diethylene triamine.

14. The process of claim 9 wherein the polyamine is triethylene tetramine.

15. The process of claim 9 wherein the polyamine is dimethylaminopropylamine.

16. The process of claim 9 wherein the aliphatic crosslinking monomer is a cycloaliphatic monomer.

17. The process of claim 9 wherein the functionalization occurs in the presence of less than about 52% water, based on the weight of the polyamine.

18. A process for removing anions from a liquid which comprises contacting the liquid with a weakly basic anion exchange resin comprising a copolymer of acrylonitrile with an aliphatic crosslinking monomer having two or more unconjugated allylic groups, functionalized with a polyamine.

* * * * *